United States Patent [19]

Grealy et al.

[11] Patent Number: 4,770,892

[45] Date of Patent: Sep. 13, 1988

[54] STABLE WHIPPABLE EMULSION AND PROCESS FOR PRODUCING SAME

[75] Inventors: Jennifer M. Grealy, Gores Landing; Barry R. May, Cobourg, both of Canada

[73] Assignee: General Foods Inc., Ontario, Canada

[21] Appl. No.: 114,469

[22] Filed: Oct. 28, 1987

[51] Int. Cl.⁴ .................. A23L 1/19; A23C 13/00; A23C 3/04
[52] U.S. Cl. .......................... 426/570; 426/399; 426/613
[58] Field of Search .................. 426/570, 399, 613

[56] References Cited

U.S. PATENT DOCUMENTS

| | | | |
|---|---|---|---|
| 4,146,652 | 3/1979 | Kahn et al. | 426/570 |
| 4,421,778 | 12/1983 | Kahn et al. | 426/564 |
| 4,505,943 | 3/1981 | Dell et al. | 426/570 |
| 4,578,276 | 3/1986 | Morley | 426/570 |
| 4,647,465 | 3/1987 | van de Ven et al. | 426/570 |

Primary Examiner—Jeanette Hunter
Attorney, Agent, or Firm—Linn I. Grim; Daniel J. Donovan

[57] ABSTRACT

A highly stable whippable emulsion has been developed which achieves long term creaming stability in the liquid form as well as whips rapidly into a highly-aerated stable foam. The process for making the stable whippable emulsion is described.

10 Claims, No Drawings

STABLE WHIPPABLE EMULSION AND PROCESS FOR PRODUCING SAME

FIELD OF THE INVENTION

This invention is directed to a process for producing an improved pourable whippable emulsion which is stable for extended periods of time at room temperature. When exposed to temperatures continuously of 32.2° C. or 90° F. for at least two weeks or longer, the product substantially maintains the original properties of the freshly made emulsions.

BACKGROUND OF THE INVENTION

The food industry is always seeking foods which have the capability of being stored and marketed in a substantially non-refrigerated condition. In order to keep foods from deteriorating, it is generally a requirement to maintain these foods in a frozen or refrigerated state throughout the period of distribution and storage by the consumer. One way to avoid freezing or refrigerating foods is to provide a hermetically sealed container and the food commercially sterilized. This procedure is not entirely satisfactory. Another method is to add large amounts of fructose or dextrose to the foods which will not freeze at normal freezing temperatures but will slowly flow under these conditions. The products containing the fructose or dextrose materials apparently reduce the availability of the water in the food for microbial growth and bacteria will not grow, thereby extending the life of the food product. These products, however, have excessive sweetness and are generally not accepted as desirable food products because of the excessive sweetness properties. These foods and techniques have been described in U.S. Pat. Nos. 4,146,652, 4,154,863, and 4,313,967. It has been discovered that a stable pourable whippable emulsion can be produced without excessive sweetness due to fructose etc., which are stable in aseptic packages for extended periods of time at room temperature and at 90° F. or 32.2° C. for at least two weeks and much longer. These whipped emulsions can provide outstanding and stable dessert toppings.

SUMMARY OF THE INVENTION

An improved sterilized stable whippable topping emulsion has been discovered which when heated in an aseptic package at 32.2° C. (90° F.) for a period of two weeks will have the following properties:
 (a) viscosity about 30 to about 130 centipoise;
 (b) whipped topping overrun at 4° C. about 250 to about 320%;
 (c) creaming value about 0.85 to about 0.91;
 (d) particle size distribution about 0.63 to about 1.5 micron;

Thus, an improved emulsion is produced which can be whipped into an acceptable topping for desserts etc. after maintaining these compositions at 32.2° C. or 90° F. in an aseptic package for at least two weeks. Normally, whippable emulsions must be maintained under refrigeration or freezing conditions to avoid spoilage of the product, but this invention provides a whippable composition which can be maintained at summer temperature conditions for extended periods of time and at normal room temperatures for longer periods of time. The process for making these improved compositions is also described herein.

DETAILS OF THE INVENTION

A highly stable whippable emulsion has been discovered which can be stored in an aseptic package at room temperature for extended periods of time, well beyond two weeks and for as long as a year and will also remain stable at slightly higher temperatures i.e., 32.2° C. or 90° F. for at least two weeks. This composition comprises:
 (a) water present from about 50 to about 70 weight percent of said emulsion;
 (b) an edible partially hydrogenated or hydrogenated vegetable fat wherein at least about 60 weight percent of the fat components solidify at about 4° C. and present from about 16 to about 24 weight percent of said emulsion;
 (c) an edible gum blend selected from the group consisting of:
  (1) water soluble sodium alginate present from about 0.15 to about 0.25 weight percent of said emulsion.
  (2) microcrystalline cellulose or methylcellulose capable of forming aqueous colloidal dispersions present from about 0.20 to about 0.30 weight percent of said emulsion;
  (3) hydroxypropyl methylcellulose having a viscosity from about 40 to about 120 centipoise in 2% concentration in water at 20° C., present from about 0.1 to about 0.3 weight percent of said emulsion;
  (4) hydroxypropyl methylcellulose having a viscosity of about 14,000 to about 16,000 centipoise in 2% concentration in water at 20° C. present from about 0.025 to about 0.1 weight percent of said emulsion and mixtures thereof.
 (d) buffer salts in amounts to maintain the pH of said emulsion about 6.5 to about 7.5.
 (e) edible emulsifiers selected from the group consisting of:
  (1) lecithin present from about 0.045 to about 0.055 weight percent of said emulsion;
  (2) glyceryl monostearate present from about 0.2 to about 0.4 weight percent of said emulsion;
  (3) sodium stearoyl-2-lactylate present from about 0.15 to about 0.25 weight percent of said emulsion, and mixtures thereof;
  (4) polyoxyethylene (20) sorbitan monostearate present from about 0.05 to about 0.15 weight percent of said emulsion.
 (f) sugar present from about 14 to about 24 weight percent of said emulsion; wherein said whippable topping emulsion after heating at 32.2° C. in an aseptic package for at least two weeks has the following properties:
 (a) viscosity about 30 to about 130 centipoise;
 (b) whippable topping overrun at 4° C. about 250 to about 320%;
 (c) creaming value about 0.85 to about 0.91;
 (d) particle size distribution about 0.63 to about 1.5 microns.

The process for producing the composition comprises the following steps utilizing the same weight proportions as described in the composition above.
 (a) water, cooled from about 5° C. to about 10° C. is mixed with a gum blend selected from the group consisting of a water-soluble sodium alginate, microcrystalline cellulose or methyl cellulose, hydroxypropyl methylcellulose, one having a viscosity of about 40 to about 120 centipoise and another having a viscosity of about 14,000 to about 16,000 centipoise, and mixtures thereof in combination with buffer salts to maintain the pH of said emulsion from about 6.5 to about 7.5, said mixing conducted until a substantially uniform product is obtained;
(b) heating the mixture of step (a) to temperatures from about 45° to about 65° C., then mix with the following: the combination selected from the group of lecithin, glyceryl monostearate, sodium stearoyl-2-lactylate, polyoxyethylene (20) sorbitan monostearate or mixtures thereof and mixing until a substantially uniform product is obtained;
(c) to the mixture of step (b) add the partially hydrogenated or hydrogenated vegetable oil and mix to obtain a substantially uniform mixture;
(d) sterilize the mixture of step (c);
(e) deaerate said product of step (d);
(f) homogenize and cool product of step (e) to temperatures no higher than about 20° C.;
(g) aseptically package the contents of step (f).

The ingredients used in the composition and process of this invention are standard ingredients. The water used can be regular drinking water, however, it is preferred to use so called "soft water" which contains less than about 5 parts per million calcium. The minimum calcium content will aid in maintaining the dispersed ingredients. In some instances, the presence of calcium can react with some gums, and gelation of the ingredients could occur prior to the desired time for the use of the emulsion product. The amount of water present in the compositions of this invention is about 50 to about 70 weight percent, preferably about 55 to about 65 weight percent of the total composition.

The edible fat partially hydrogenated or hydrogenated vegetable fats used herein include; coconut, cottonseed, corn, soybean, peanut, olive, sunflower, safflower, palm kernel and the like and combinations thereof. The essential feature of these fats are that the components must be such that at 4° C., at least about 60 weight percent of the fat components will solidify. This insures a whippable emulsion. The amounts of fats present range from about 16 to about 24 weight percent, preferably from about 18 to about 22 weight percent of the total composition. It is preferred that fat used has an iodine value of about 10 or lower.

The term "sugar" as is used in the present context is to be understood as meaning any of a number of useful saccharide materials which provide a sweetening effect. These sugars include monosaccharides, disaccharides, polysaccharides and degradation products such as pentoses including aldopentoses, methylpentoses and ketopentoses like xylose and arabinose; a deoxyaldose like rhamnose: hexoses and reducing saccharides such as aldohexoses like glucose, galactose and mannose; the ketohexoses, like fructose and sorbose; disaccharides such as sucrose and other polysaccharides such as dextrin and raffinose, and hydrolyzed starches which contain as their constituents oligosaccharides. Commercial sugars include sucrose, dextrose, levulose, maltose, corn syrup solids among others. The amount of sugar present in amounts ranging from about 12 to about 24 weight percent, preferably about 14 to about 18 weight percent of the total composition.

Other ingredients known to those skilled in the art may also be employed to impart their characteristic effects to the compositions of the present invention. Typical of such ingredients are flavoring agents, colorants, buffer salts, sodium chloride, vitamins, minerals and the like. Suitable flavoring agents can be employed to impart vanilla, cream, milk, chocolate, coffee, maple, butter, spice, mint, caramel, fruit and other flavors. Buffer salts such as disodium phosphate, trisodium citrate and the like can be added to inhibit the coagulating effect of the emulsion product. The amount of buffer salts present are in amounts to maintain the PH of the emulsion in the range of about 6.5 to about 7.5, preferably 6.8 to 7.2. Various colorants such as beta carotene etc. can be used and are well known in the art. The amounts of ingredients will depend on the tastes, color and various other properties desired in the finished product.

Specific edible emulsifiers are necessary ingredients of the compositions of the present invention. Lecithin present in amounts ranging from 0.045 to about 0.055 weight percent of the total composition is required to provide stability and coats the fat globules. Polyoxyethylene (20) sorbitan monostearate (Polysorbate 60) present in amounts from about 0.05 to about 0.15 weight percent of the total composition, allows the formation of the initial emulsion to obtain smaller particle size formulations. The particle size distribution of the total emulsion range from about 0.63 to about 1.5 microns. Without polysorbate 60 larger particle sizes are obtained which results in a low creaming value and a low projected storage stability. Glyceryl monostearate, present from about 0.2 to about 0.4 weight percent of the total composition, in combination with sorbitan monostearate provides excellent creaming values. Sodium stearoyl-2-lactylate present in amount from about 0.15 to about 0.25 weight percent of the total emulsion, is a whipping aid and surfactant. The presence of sodium stearoyl-2-lactylate provides emulsion stability, high creaming values and high whipping overruns. The preferred emulsifying system for this invention is a combination of all of the emulsifiers described above.

The edible gum blends which are used to produce the compositions of this invention are specifically to achieve the desired properties such as foam stabilization, film formation, whipping aid, thickness, emulsion stability and the like of the whippable topping emulsion. Included herein is a water-soluble sodium alginate present in amounts ranging from about 0.15 to about 0.25 weight percent of the total emulsion product. The edible cellulosic products included in the gum blend of the composition of this invention include a microcrystalline cellulose or methylcellulose which is capable of forming aqueous colloidal dispersions. These cellulose products are present in amounts ranging from about 0.20 to about 0.30 weight percent of the total emulsion. Additional cellulose products include 2 types of hydroxypropyl methylcellulose. One type has a viscosity about 40 to about 120 centipoise in a 2% concentration of water at 20° C. and present in amounts from about 0.1 to about 0.3 weight percent of the total emulsion. The other type has a viscosity about 14,000 to about 16,000 centipoise in a 2% concentration of water at 20° C. and present in amounts from about 0.025 to about 0.1 weight percent of the total emulsion. The preferred gum blend includes mixtures of the above described ingredients and more specifically preferred is the combination of microcrystalline cellulose, and the two types of hydroxypropyl methylcellulose.

After all of the ingredients of the whippable emulsion have been substantially homogeneously blended, the product is sterilized prior to placing in a package. Many means of sterilization can be used but a preferred method is the rapid heating of the product at 142° C. for 4 seconds. After sterilization, the product is deaerated. If desired the deaeration can take place prior to the sterilization. Prior to packaging, preferably in an aseptic package i.e. sealed and having substantially no exposure to air or surrounding atmosphere. To achieve the best results for a whippable emulsion, although not required, the finished packaged product should be held at 4° C. for a period of time to assure that substantially all of the fats in the emulsion have solidified. The time for the finished product to be held can range from about 24 hours to about 60 hours and preferably about 48 hours. It is required that the emulsion product of this invention be at refrigeration temperatures (about 4° C.) to achieve the best results when the whipping of the emulsion occurs to the solid topping product. The time of whipping to achieve the desired solid topping product can vary depending on the type of beaters used. In general, however, a standard beater used to whip the emulsion product should take no longer than about 4 minutes.

Air is readily entrapped during the processing steps in the emulsion production, resulting in approximately 5% decrease in the density of the liquid product. The presence of air might adversely affect product flavor (particularly lipid oxidation). Deaeration can be affected by a variety of different equipment, such as vacuum deaeration, flash evaporation or the like and can be done either before or after sterilization.

The emulsion product can be sterilized by both direct or indirect ultra high temperature equipment. Plate heat exchangers, steam injection, steam infusion etc. are some of the ways to sterilize the product. Temperatures of 142° C. (285° F.) must be achieved and held for 4 seconds to ensure sterilization of a neutral pH product.

In post-sterilization homogenization of the emulsion product one should use an aseptic homogenizer. The first stage pressures used a two-stage homogenizer (Manton-Gaulin) should range from about 2000 to about 4500 psi, preferably 2500 psi while the second stage pressures should range from about 300 psi to about 600 psi, preferably 500 psi. Homogenization temperatures in excess of fat melting points are required. Higher temperatures promote lower viscosity of the emulsion product and facilitate achieving small particle size oil droplets in the final product. Homogenization temperatures of about 75° C. are highly recommended.

After homogenization, it is recommended that the resulting product be cooled to temperatures no higher than 20° C., preferably about 15° C. to about 20° C. At these temperatures, a large portion of the fat in the emulsion product will solidify stabilizing the newly-formed emulsion. At higher temperatures, the fats in the emulsion are mostly liquid and the emulsion is less stable.

The viscosity measurements were made using a Haake Rotovisco RV100 with CV100 measuring head. An Me30 Mooney-Ewart sensor system was used. Most samples were allowed to equilibrate 10 minutes in the viscometer and were evaluated at 25° C. Other samples, where designated, were evaluated at 20° C. A flow curve of shear stress versus shear rate, to a maximum shear rate of $30S^{-1}$ was obtained using a 4-minute sweep time. Viscosity is defined as a fluid resistance to flow freely. It is the ratio of shear stress to shear rate. Viscosity is reported in Pa.s and converted to centipoise (1 Pa.s=1,000 centipoise).

The creaming value as used herein is a measure of emulsion separation under certain conditions and provides an accelerated method of predicting emulsion storage stability. Samples of emulsion are introduced into 1 milliliter graduated Wintrobe (blood) tubes. A centrifuge with free swinging buckets is used for this test, as the force applied must be parallel to the axis of the sample. The centrifuge is allowed to cool to 10° C. Samples are balanced and placed in the centrifuge. Samples are spun for 30 minutes at 2400 rpm at a temperature of 20° C. The centrifuge samples have a cream layer and a clear layer. The creaming value is determined as follows:

$$\text{creaming value} = \frac{\text{height of cream layer}}{\text{total height}}$$

The closer the value to 1.0, the less emulsion separation and the better the predicted stability. For a 24% fat emulsion, the lowest value possible is 0.24. For 20% fat, the lowest value would be 0.20 and the like for other fat values.

The whipping properties of each emulsion were evaluated by measuring overrun. All evaluations were made on chilled (4° C.) product, a Kitchen Aid mixmaster, at the highest speed (12) was used for evaluations. All samples were whipped for 4 minutes.

Overrun is calculated as follows:

$$\frac{\text{weight of liquid emulsion} - \text{weight of same volume of aerated emulsion}}{\text{weight of same volume of aerated emulsion}} \times 100 = \% \text{ overrun}$$

Overrun can vary with mixer rpm, mixer speed, mixing time and volume of emulsion whipped. These variables must be held constant for meaningful comparisons to be made.

Particle sizes were measured using a Coulter Counter with a 30 micron aperture. Ten drops of emulsion are diluted in 50 milliliters of distilled water. A micro amount of this dilution is further diluted in approximately 25 milliliter of Isoton II with 4% NaCl electrolyte solution. All emulsions were examined microscopically for aggregated or flocculated droplets and the particle size distribution determined. The following examples further illustrate the invention.

EXAMPLE 1

A whippable emulsion can be made from the following formulation:

| Ingredients | Weight % (Total Emulsion) |
|---|---|
| Soft Water having no ppm calcium | 63.0 |
| Combination of Hydrogenated Coconut Oil and Hydrogenated Palm Kernel Oil having a melting point range of 37.2 to 39.4° C. Wherein at least 60 weight percent of the fat components will solidify at 4° C. | 20.0 |
| Sugar | 15.0 |
| Vanilla Flavor | 0.40 |
| Glyceryl Monostearate | 0.30 |
| Microcrystalline Cellulose capable of forming aqueous colloidal dispersions | 0.25 |

-continued

| Ingredients | Weight % (Total Emulsion) |
|---|---|
| Sodium Stearoyl-2-Lactylate | 0.20 |
| Hydroxypropyl Methylcellulose a viscosity of about 50 centipoise at 2% concentration in water at 20° C. | 0.20 |
| Disodium Phosphate | 0.138 |
| Trisodium Citrate | 0.138 |
| Polyoxyethylene (20) sorbitan monostearate | 0.10 |
| NaCl | 0.075 |
| Milk Flavor | 0.07 |
| Lecithin | 0.05 |
| Hydroxypropyl Methylcellulose having a viscosity of about 15000 at centripoise at 2% concentration in water at 20° C. | 0.05 |
| Butter Flavor | 0.016 |
| Beta Carotene | 0.010 |

Cold softened water (5–10° C.) is added into a batch tank. To the tank, via a blending funnel, is added the edible gum blend of microcrystalline cellulose, both hydroxypropyl methylcelluloses; the salts of sodium chloride, disodium phosphate, trisodium citrate; the color beta carotene. The mixture is mixed for twenty minutes to obtain a substantially uniform mixture. This mixture is heated to 50–60° C. and the sugar and edible emulsifiers: glyceryl monostearate; polyoxyethylene (20) sorbitan monosterate; lecithin and sodium stearoyl-2-lactylate are added. The mixture is blended for five minutes to obtain a substantially uniform product to this product is added the vanilla flavor, milk flavor and butter flavor and the resulting product mixed for 5 minutes to uniformily distribute the flavor additives. The liquid fat of hydrogenated coconut and palm kernel oil is added to the mixture and mixed for 5 minutes to uniformily distribute the fat. The resulting product is sterilized at 142° C. for 4 seconds over a plate heat exchanger. The sterilized product is deaerated, cooled to 75° C., homogenized in a two-stage homogenizer (Manton-Gaulin), the first stage maintained at 2500 psi and the second stage at 500 psi. The homogenized product is cooled at 20° C. prior to packaging and packaged in a one liter aseptic package.

Storage stability of the product is as follows:

| Refrigerated | >1 Year |
|---|---|
| 70° F. (21.1° C.) (room temperature) | 1 year |
| 90° F. or 32.2° C. | 4 months |

The product had the following properties:

| | Fresh Product | One Year @ Room Temperature |
|---|---|---|
| Overrun (maintained a minimum of 48 hours at 4° C. prior to whipping) | 300% | 280% |
| pH | 7.0 | 6.87 |
| Particle Size | 0.63–1.25 micron | 0.89–1.5 micron |
| Creaming Value | 0.86 | 0.86 |
| Viscosity | 35–50 centipoise | 35–40 centipoise |

Similar properties were observed for the refrigerated product of one year and the 90° or 32° C. treated product for 4 months.

EXAMPLE 2

A whippable emulsion can be made from the following formulation:

| Ingredients | Weight % (Total Emulsion) |
|---|---|
| Water | 63.0 |
| Hydrogenated Palm Kernel Oil wherein 60% weight fat components soldify at 4° C. | 24.0 |
| Liquid Sucrose | 22.4 |
| Vanilla Flavor | 0.385 |
| Glyceryl Monostearate | 0.40 |
| Sodium Alginate | 0.20 |
| Sodium Stearoyl-2-Lactylate | 0.20 |
| Hydroxypropyl Methylcellulose a viscosity of about 100 centipoise at 2% concentration in water at 20° C. | 0.350 |
| Disodium Phosphate | 0.020 |
| Trisodium Citrate | 0.020 |
| Polyoxyethylene (20) sorbitan monostearate | 0.10 |
| NaCl | 0.075 |
| Lecithin | 0.05 |
| Sweet Cream Flavor | 0.00038 |
| Beta Carotene beadlets | 0.014 |

Cold softened water (5°–10° C.) is added into a batch tank. To the tank, via a blending funnel, is added the edible gum blend of sodium alginate, both hydroxypropyl methylcellulose; the salts of sodium chloride, disodium phosphate, trisodium citrate; the color beta carotene. The mixture is mixed for twenty minutes to obtain a substanially uniform mixture. This mixture is heated to 50°–60°C. and the sugar and the edible emulsifiers: glyceryl monostearate; polyoxyethylene (20) sorbitan monostearate; lecithin and sodium stearoyl-2-lactylate are added. The mixture is blended for five minutes to obtain a substantially uniform product to this product is added the vanilla flavor, and sweet cream and the resulting product mixed for 5 minutes to uniformly distribute this flavor additives. The liquid fat of hydrogenated palm kernel oil is added to the mixture and mixed for 5 minutes to uniformly distribute the fat. The resulting product is sterilized at 142° C. for 4 seconds in a plate heat exchanger. The sterilized product is deaerated, cooled to 75° C., homogenized in a two-stage homogenizer (Manton-Gaulin), the first stage maintained at 2500 psi and the second stage at 500 psi. The homogenized product is cooled to 20° C. prior to packaging and packaged in a one liter aseptic package.

The product had the following properties:

| | Fresh Product | 4 Weeks at 90° F. or 32.2° C. Storage |
|---|---|---|
| Overrun (maintained a minimum of 48 hours at 4° C. prior to whipping) | 260–270% | 220% |
| pH | 7.0 | 6.87 |
| Particle Size | 0.63–0.89 microns | 0.63–0.89 microns |
| Creaming Value | 0.89 | 0.86 |
| Viscosity | 115 centipoise | 129 centipoise |

The product after two weeks of 90° F. or 32.2° C. maintained the physical properties of the fresh product but after four weeks, the overrun decreased significantly and the viscosity increased.

EXAMPLE 3

A whippable emulsion can be made from the following formulation:

| Ingredients | Weight % (Total Emulsion) |
| --- | --- |
| Water | 56.1 |
| Hydrogenated Palm Kernel Oil wherein 60% fat components solidify at 4° C. | 20.0 |
| Liquid Sucrose | 22.4 |
| Vanilla Flavor | 0.40 |
| Glyceryl Monostearate | 0.30 |
| Sodium Alginate | 0.20 |
| Sodium Stearoyl-2-Lactylate | 0.20 |
| Hydroxypropyl Methylcellulose a viscosity of about 50 centipoise at 2% concentration in water at 20° C. | 0.20 |
| Disodium Phosphate | 0.20 |
| Trisodium Citrate | 0.20 |
| Polyoxyethylene (20) sorbitan monostearate | 0.10 |
| NaCl | 0.075 |
| Milk Flavor | 0.03 |
| Lecithin | 0.05 |
| Hydroxypropyl Methylcellulose having a viscosity of about 15000 centipoise at 2% concentration in water at 20° C. | 0.05 |
| Beta Carotene beadlets | 0.014 |

Cold softened water (5°-10° C.) is added into a batch tank. To the tank, via a blending funnel, is added the edible gum blend of sodium alginate, both hydroxypropyl methylcellulose; the salts of sodium chloride, disodium phosphate, trisodium citrate; the color beta carotene. The mixture is mixed for twenty minutes to obtain a substantially uniform mixture. This mixture is heated to 50°-60° C. and the sugar and the edible emulsifiers: glyceryl monostearate; polyoxyethylene (20) sorbitan monostearate; lecithin and stearoyl-2-lactylate are added. The mixture is blended for five minutes to obtain a substantially uniform product to this product is added the vanilla flavor, and milk flavor and the resulting product mixed for 5 minutes to uniformly distribute the flavor additives. The liquid fat of hydrogenated palm kernel oil is added to the mixture and mixed for 5 minutes to uniformly distribute the fat. The resulting product is sterilized at 142° C. for 4 seconds in a plate heat exchanger. The sterilized product is deaerated, cooled to 75° C., homogenized in a two-stage homogenizer (Manton-Gaulin), the first stage maintained at 2500 psi and the second stage at 500 psi. The homogenized product is cooled to 20° C. prior to packaging and packaged in a one liter aseptic package.

The product had the following properties:

| | Fresh Product | 11 Weeks at 90° F. or 32.2° C. Storage |
| --- | --- | --- |
| Overrun (maintained a minimum of 48 hours at 4° C. prior to whipping) | 283% | 254% |
| pH | 7.1 | 6.9 |
| Particle Size | 0.63–0.89 microns | 0.63–0.89 microns |
| Creaming Value | 0.86 | 0.86 |
| Viscosity | 68.5 centipoise | 67.9 centipoise |

The invention has been described in terms of specific embodiments set forth in detail but it should be understood that these are by way of illustration only and that the invention is not necessarily limited thereto. Modifications and variations will be apparent from this disclosure and may be resorted to without departing from the spirit of this invention as those skilled in the art will readily understand. Accordingly, such variations and modifications of the disclosed products are considered to be within the scope of this invention and the following claims.

What is claimed is:

1. An improved sterilized stable whippable topping emulsion which comprises:
    (a) water present from about 50 to about 70 weight percent of said emulsion;
    (b) an edible partially hydrogenated or hydrogenated vegetable fat wherein at least about 60 weight percent of the fat components solidify at about 4° C. and present from about 16 to about 24 weight percent of said emulsion;
    (c) an edible gum blend selected from the group consisting of:
        (1) water soluble sodium alginate present from about 0.15 to about 0.25 weight percent of said emulsion.
        (2) microcrystalline cellulose or methylcellulose capable of forming aqueous colloidal dispersions present from about 0.20 to about 0.30 weight percent of said emulsion;
        (3) hydroxypropyl methylcellulose having a viscosity about 40 to about 120 centipoise in 2% concentration in water at 20° C., present from about 0.1 to about 0.3 weight percent of said emulsion;
        (4) hydroxypropyl methylcellulose having a viscosity of about 14,000 to about 16,000 centipoise in 2% concentration in water at 20° C. present from about 0.025 to about 0.1 weight percent of said emulsion and mixtures thereof.
    (d) buffer salts in amounts to maintain the pH of said emulsion about 6.5 to about 7.5.
    (e) edible emulsions selected from the group consisting of:
        (1) lecithin present from about 0.045 to about 0.055 weight percent of said emulsion;
        (2) glyceryl monstearate present from about 0.2 to about 0.4 weight percent of said emulsion;
        (3) sodium stearoyl-2-lactylate present from about 0.15 to about 0.25 weight percent of said emulsion;
        (4) polyoxyethylene (20) sorbitan monostearate present from about 0.05 to about 0.15 weight percent of said emulsion; and mixtures thereof;.
    (f) sugar present from about 14 to about 24 weight percent of said emulsion; wherein said whippable topping emulsion after heating at 32.2° C. in an aseptic package for at least two weeks has the following properties:
    (a) viscosity about 30 to about 130 centipoise;
    (b) whippable topping overrun at 4° C. about 250 to about 320%;
    (c) creaming value about 0.85 to about 0.91;
    (d) particle size distribution about 0.63 to about 1.5 microns.

2. The composition of claim 1 wherein the water is soft and contains less than about 5 parts per million calcium.

3. The composition of claim 1 which contains sodium chloride, flavors and buffer salts.

4. The composition of claim 2 which contains sodium chloride, flavors, buffer salts, microcrystalline cellulose, both hydroxypropyl methylcelluloses, lecithin, glyceryl monostearate, polyoxyethylene (20) sorbitan monostearate, sodium stearoyl-2-lactylate and the fat is hydrogenated palm kernel oil.

5. The composition of claim 4 wherein the fat is a combination of hydrogenated palm kernel oil and hydrogenated coconut oil.

6. The composition of claim 1 wherein:

| | | wt. % of said emulsion |
|---|---|---|
| (a) | soft water with 0 ppm calcium | 63.00 |
| (b) | hydrogenated coconut and palm kernel oil having a melting point range of 37.2 to 39.4° C. wherein at least 60 weight percent of the fat components solidify at 40° C. | 20.00 |
| (c) | sugar | 15.00 |
| (d) | vanilla flavor | 0.40 |
| (e) | glyceryl monostearate | 0.30 |
| (f) | microcrystalline cellulose | 0.25 |
| (g) | sodium stearoyl-2-lactylate | 0.20 |
| (h) | hydroxypropyl methylcelluose having a viscosity about 50 centipoise 2% concentration in water at 20° C. | 0.20 |
| (i) | disodium phosphate | 0.138 |
| (j) | trisodium citrate | 0.138 |
| (k) | polyoxyethylene (20) sorbitan monostearate | 0.1 |
| (l) | sodium chloride | 0.075 |
| (m) | milk flavor | 0.07 |
| (n) | lecithin | 0.05 |
| (o) | hydroxypropyl methylcellulose having a viscosity of 15,000 in 2% concentration in water at 20° C. | 0.05 |
| (p) | butter flavor | 0.016 |
| (q) | beta carotene | 0.010 |

7. The composition of claim 4 wherein water soluble sodium alginate is substituted for microcrystalline cellulose.

8. A process for producing the composition of claim 1 in the same weight proportions which comprises:
   (a) mixing water cooled to about 5° C. to about 10° C. with a gum blend selected from the group consisting of a water soluble alginate, microcrystalline cellulose or methylcellulose, hydroxypropyl methylcellulose, one having a viscosity of about 40 to about 120 centipoise and another having a viscosity of about 14,000 to 16,000 centipoise, and mixtures thereof in combination with sufficient amounts of buffer salts to maintain the pH of said emulsion from about 6.5 to about 7.5; said mixing conducted until a substantially uniform product is obtained;
   (b) heating the mixture of step (a) to temperatures from about 45° to about 65° C., then mix with the following: the combination selected from the group of lecithin, glyceryl monostearate, sodium stearoyl-2-lactylate and polyoxyethylene (20) sorbitan monostearate and mixing until a substantially uniform product is obtained;
   (c) to the mixture of step (b) add the partially hydrogenated or hydrogenated vegetable oil and mix to obtain a substantially uniform mixture;
   (d) sterilize the mixture of step (c);
   (e) deaerate said product of step (d);
   (f) homogenize and cool product of step (e) to temperatures no higher than about 20° C.;

9. A process for producing a stable whippable emulsion which maintains its stability after heating at 32.2° C. in an aseptic package for at least two weeks which comprises:
   (a) mixing about 50 to about 70 weight percent soft water containing less than about 5 parts per million calcium and cooled to about 5° C. to about 10° C. with:
      (1) about 0.20 to about 0.30 weight percent microcrystalline cellulose capable of forming aqueous colloidal dispersions;
      (2) about 0.1 to about 0.3 weight percent hydroxypropyl methylcellulose having a viscosity about 40 to about 120 centipoise in 2% concentration in water at 20° C.;
      (3) about 0.025 to about 0.1 weight percent hydroxypropyl methylcellulose having a viscosity about 14,000 to about 16,000 centipoise in 2% concentration in water at 20° C.;
      (4) buffer salts in sufficient amounts to maintain the pH of said emulsion from about 6.8 to about 7.2 said mixing conducted until a substantially uniform product is obtained;
   (b) heating the mixture of step (a) to temperatures from about 45° to about 65° C. Then mix with (a) the following:
      (1) 12 to about 24 weight percent sugar;
      (2) about 0.2 to about 0.4 weight percent glyceryl monostearate;
      (3) about 0.15 to about 0.25 weight percent sodium stearoyl-2-lactylate;
      (4) about 0.045 to about 0.055 weight percent lecithin;
      (5) about 0.05 to about 0.15 weight percent polyoxyethylene (20) sorbitan monostearate mixing until a substantially uniform product is obtained;
   (c) to the product of step (b) add about 16 to about 24 weight percent of an edible partially hydrogenated or hydrogenated vegetable fat wherein at least about 60 weight percent of the fat components solidifies at 4° C. and mix to obtain a substantially uniform mixture;
   (d) sterilize the mixture of step (c);
   (e) deaerate said product of step (2);
   (f) homogenize, cool product to 20° C.

10. The process of claim 9 wherein sodium alginate is substituted for microcrystalline cellulose.

* * * * *